US012652486B2

(12) United States Patent
Li et al.

(10) Patent No.: US 12,652,486 B2
(45) Date of Patent: Jun. 9, 2026

(54) EARPHONE WITH COAXIAL FREQUENCY DEMULTIPLICATION SPEAKER

(71) Applicant: DONGGUAN SHIWEI ELECTRONIC TECHNOLOGY CO., LTD., Dongguan (CN)

(72) Inventors: Keqiang Li, Dongguan (CN); Yongxiang Zou, Dongguan (CN)

(73) Assignee: DONGGUAN SHIWEI ELECTRONIC TECHNOLOGY CO., LTD., Dongguan (CN)

( * ) Notice: Subject to any disclaimer, the term of this patent is extended or adjusted under 35 U.S.C. 154(b) by 147 days.

(21) Appl. No.: 18/804,272

(22) Filed: Aug. 14, 2024

(65) Prior Publication Data

US 2026/0032374 A1 Jan. 29, 2026

(30) Foreign Application Priority Data

Jul. 25, 2024 (CN) ........................ 202421765582.8

(51) Int. Cl.

| | |
|---|---|
| ***H04R 1/24*** | (2006.01) |
| ***H04R 1/10*** | (2006.01) |
| ***H04R 9/06*** | (2006.01) |
| ***H04R 17/10*** | (2006.01) |

(52) U.S. Cl.

CPC ............. *H04R 1/24* (2013.01); *H04R 1/1008* (2013.01); *H04R 1/1075* (2013.01); *H04R 9/06* (2013.01); *H04R 17/10* (2013.01)

(58) Field of Classification Search

CPC ...... H04R 1/24; H04R 1/1008; H04R 1/1075; H04R 9/06; H04R 17/10

See application file for complete search history.

(56) References Cited

U.S. PATENT DOCUMENTS 3,984,885 A * 10/1976 Yoshimura ........... H04R 1/1075 381/74

4,418,248 A * 11/1983 Mathis ..................... H04R 1/26 381/373

(Continued)

FOREIGN PATENT DOCUMENTS

CN 223053095 U * 7/2025

JP 3248721 U * 10/2024

*Primary Examiner* — Olisa Anwah

(74) *Attorney, Agent, or Firm* — Birchwood IP

(57) ABSTRACT

An earphone with coaxial frequency multiplication speaker is provided, which includes an earphone housing. An upper of an inner side of the earphone housing is fixed with a hollow mounting bracket. An inner side of the hollow mounting bracket is provided with an annular piezoelectric ceramic speaker for expressing medium and high frequencies. A large dynamic coil speaker for expressing medium and low frequencies is provided on an inner side of the earphone housing and a lower of the hollow mounting bracket. A flat speaker for expressing high frequencies is provided at an upper of the hollow mounting bracket and an inner side of the annular piezoelectric ceramic speaker; a circular piezoelectric ceramic speaker for expressing ultra-high frequencies is provided at an upper of the flat speaker. The annular piezoelectric ceramic speaker, large dynamic coil speaker, flat speaker, and circular piezoelectric ceramic speaker are arranged coaxially.

8 Claims, 3 Drawing Sheets

(56) References Cited

U.S. PATENT DOCUMENTS

| | | | | |
|---|---|---|---|---|
| 4,965,836 | A * | 10/1990 | Andre | H04R 1/1008 181/129 |
| 9,532,133 | B2 * | 12/2016 | Huang | H04R 1/10 |
| 10,129,649 | B2 * | 11/2018 | Kihm | H04R 5/0335 |
| 10,873,801 | B1 * | 12/2020 | Hsu | H04R 1/288 |
| 12,356,163 | B1 * | 7/2025 | Shetye | H04R 1/24 |
| 2024/0187782 | A1 * | 6/2024 | Ren | H04R 1/1016 |
| 2025/0080899 | A1 * | 3/2025 | Huang | H04R 1/323 |

* cited by examiner

EARPHONE WITH COAXIAL FREQUENCY DEMULTIPLICATION SPEAKER

CROSS-REFERENCE TO RELATED APPLICATIONS

This application claims priority to Chinese Patent Application No. 202421765582.8, filed on Jul. 25, 2024, which is hereby incorporated by reference in its entirety.

TECHNICAL FIELD

The present disclosure relates to the field of earphone technologies, and in particular, to an earphone with coaxial frequency multiplication speaker.

BACKGROUND

Most of the existing ordinary large headphones or noise reduction large headphones are a large dynamic coil speaker, which has strong performance in mid-bass, but lacks performance in mid to high, high, and ultra-high bass. There are also some ordinary large headphones that have a large dynamic coil speaker and a high-frequency dynamic coil speaker, compensating for high frequencies with high-frequency dynamic coils. However, if the large dynamic coil speaker (with mid to low frequency performance) and the high-frequency dynamic coil speaker are not located on the same axis, there may be a left-right difference in sound performance. Therefore, the present application proposes an earphone with coaxial frequency multiplication speaker.

SUMMARY

In view of this, it is necessary to provide an earphone with coaxial frequency multiplication speaker that addresses the aforementioned technical issues. Through an overall structural design, it can enhance an overall sound expression and reflect a depth of the sound, thereby improving an overall audio performance of the earphone.

In order to solve the above technical problems, the present disclosure adopts the following technical solution.

An earphone with coaxial frequency multiplication speaker, including an earphone housing, where an upper of an inner side of the earphone housing is provided with a hollow mounting bracket, an inner side of the hollow mounting bracket is provided with an annular piezoelectric ceramic speaker configured to express medium and high frequencies; a large dynamic coil speaker configured to express medium and low frequencies is provided on the inner side of the earphone housing and a lower of the hollow mounting bracket, a flat speaker configured to express high frequencies is provided at an upper of the hollow mounting bracket and an inner side of the annular piezoelectric ceramic speaker, an upper of the flat speaker is provided with a circular piezoelectric ceramic speaker configured to express ultra-high frequencies.

In an embodiment of the present disclosure, an upper of the earphone housing is provided with an earmuff, the earmuff is located at the upper of the hollow mounting bracket.

In an embodiment of the present disclosure, the annular piezoelectric ceramic speaker, the large dynamic coil speaker, the flat speaker, and the circular piezoelectric ceramic speaker are coaxially arranged.

In an embodiment of the present disclosure, the earmuff is made of foam material.

In an embodiment of the present disclosure, a diameter of the circular piezoelectric ceramic speaker is smaller than a diameter of the annular piezoelectric ceramic speaker.

In an embodiment of the present disclosure, the annular piezoelectric ceramic speaker and the large dynamic coil speaker are both attached to the hollow mounting bracket.

In an embodiment of the present disclosure, a head mounted connection bracket is provided on an outer side of the earphone housing.

In an embodiment of the present disclosure, the earmuff is fixed to the earphone housing by adhesive bonding.

Compared with existing technologies, the present disclosure has the following beneficial effects.

The earphone with coaxial frequency multiplication speaker provided by the present disclosure has the characteristics of soft sound, ultra-high power, good bass effect, and wide frequency response through the large dynamic coil speaker, wide frequency response range, clear and natural sound quality, smooth response frequency, and high-quality sound through the annular piezoelectric ceramic speaker and circular piezoelectric ceramic speaker, and low distortion, excellent resolution, wide frequency response, and high output power through the flat speaker. The coaxial arrangement of the annular piezoelectric ceramic speaker, large dynamic coil speaker, flat speaker, and circular piezoelectric ceramic speaker renders an overall sound performance of this earphone stronger, better reflects a depth of the sound, and improves an overall audio performance of the earphone.

BRIEF DESCRIPTION OF DRAWINGS

In order to provide a clearer explanation of the solution in the present disclosure, a brief introduction will be given to the accompanying drawings required for the description of the embodiments. It is obvious that the accompanying drawings in the following description are some embodiments of the present disclosure. For those skilled in the art, other drawings can be obtained based on these drawings without creative work.

Figure 1:
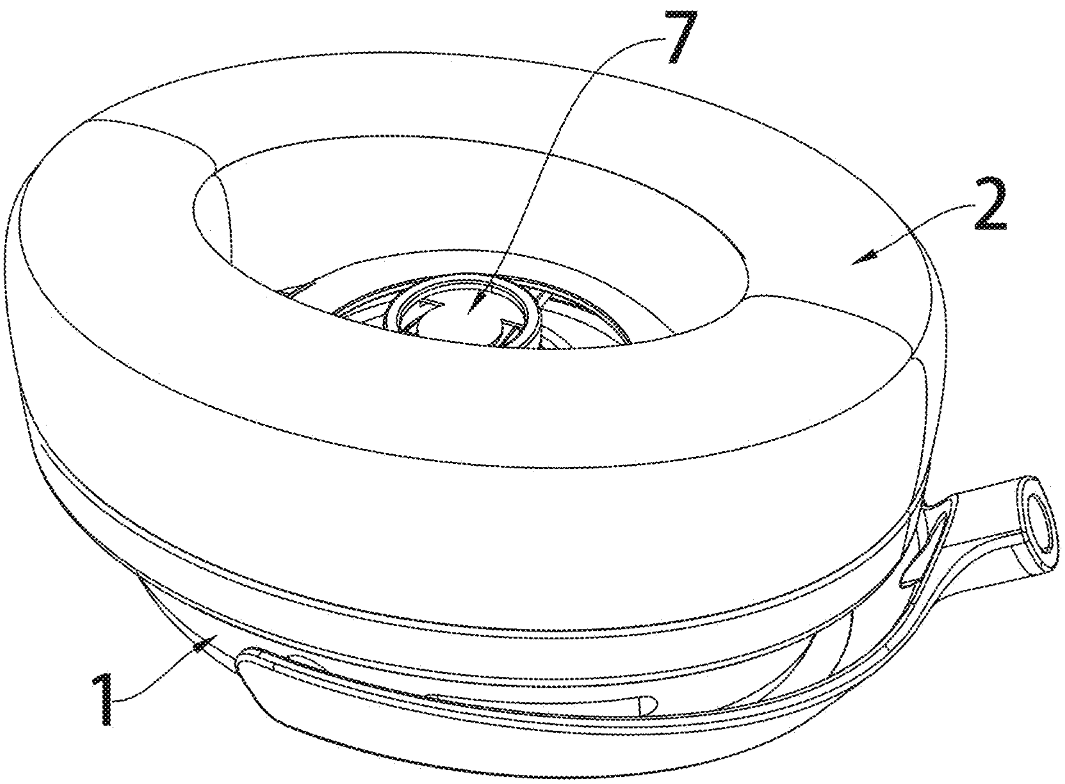
FIG. 1 is a schematic diagram of an overall structure of an earphone with coaxial frequency multiplication speaker provided by the present disclosure.

Numeral reference: 1—earphone housing; 2—earmuff; 3—hollow mounting bracket; 4—annular piezoelectric ceramic speaker; 5—large dynamic coil speaker; 6—flat speaker; 7—circular piezoelectric ceramic speaker.

DESCRIPTION OF EMBODIMENTS

As described in the background technology, large dynamic speakers have strong performance in mid-bass, but lacks performance in mid to high, high, and ultra-high bass. There are also some ordinary large headphones that have a large dynamic coil speaker and a high-frequency dynamic coil speaker, compensating for high frequencies with high-frequency dynamic coils. However, if the large dynamic coil speaker (with mid to low frequency performance) and the high-frequency dynamic coil speaker are not located on the same axis, there may be a left-right difference in sound performance.

In order to solve this technical problem, the present disclosure provides an earphone with coaxial frequency multiplication speaker, which includes an earphone housing 1, an upper of an inner side of the earphone housing 1 is provided with a hollow mounting bracket 3, an inner side of the hollow mounting bracket 3 is provided with an annular piezoelectric ceramic speaker 4 configured to express medium and high frequencies; a large dynamic coil speaker 5 configured to express medium and low frequencies is provided at the inner side of the earphone housing 1 and a lower of the hollow mounting bracket 3; a flat speaker 6 configured to express high frequencies is provided at an upper of the hollow mounting bracket 3 and an inner side of the annular piezoelectric ceramic speaker 4, an upper of the flat speaker 6 is provided with a circular piezoelectric ceramic speaker 7 configured to express ultra-high frequencies.

The earphone with coaxial frequency multiplication speaker provided by the present disclosure has characteristics of soft sound, ultra-high power, good bass effect, and wide frequency response through the large dynamic coil speaker, wide frequency response range, clear and natural sound quality, smooth response frequency, and high-quality sound through the annular piezoelectric ceramic speaker and circular piezoelectric ceramic speaker, and low distortion, excellent resolution, wide frequency response, and high output power through the flat speaker. The coaxial arrangement of the annular piezoelectric ceramic speaker, large dynamic coil speaker, flat speaker, and circular piezoelectric ceramic speaker renders an overall sound performance of this earphone stronger, better reflects a depth of the sound, and improves an overall audio performance of the earphone.

It should be noted that, without conflict, the embodiments and features and technical solutions in the present disclosure can be combined with each other.

It should be noted that similar labels and letters represent similar member in the following drawings. Therefore, once a member is defined in one drawing, it does not need to be further defined and explained in subsequent drawings.

Embodiment 1

Figure 2:
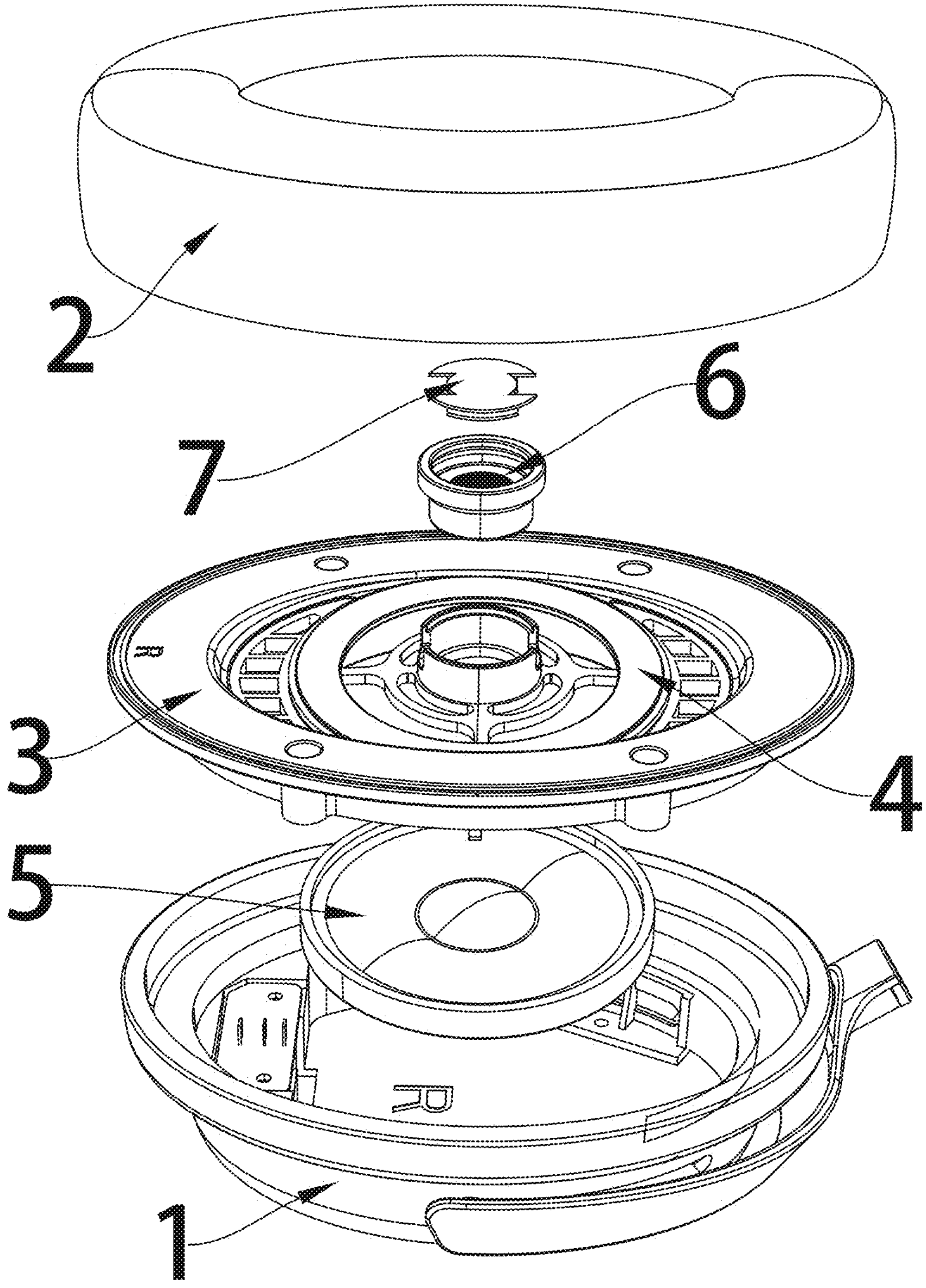
FIG. 2 is an exploded view of an overall structure of the earphone with coaxial frequency multiplication speaker provided by the present disclosure.
Figure 3:
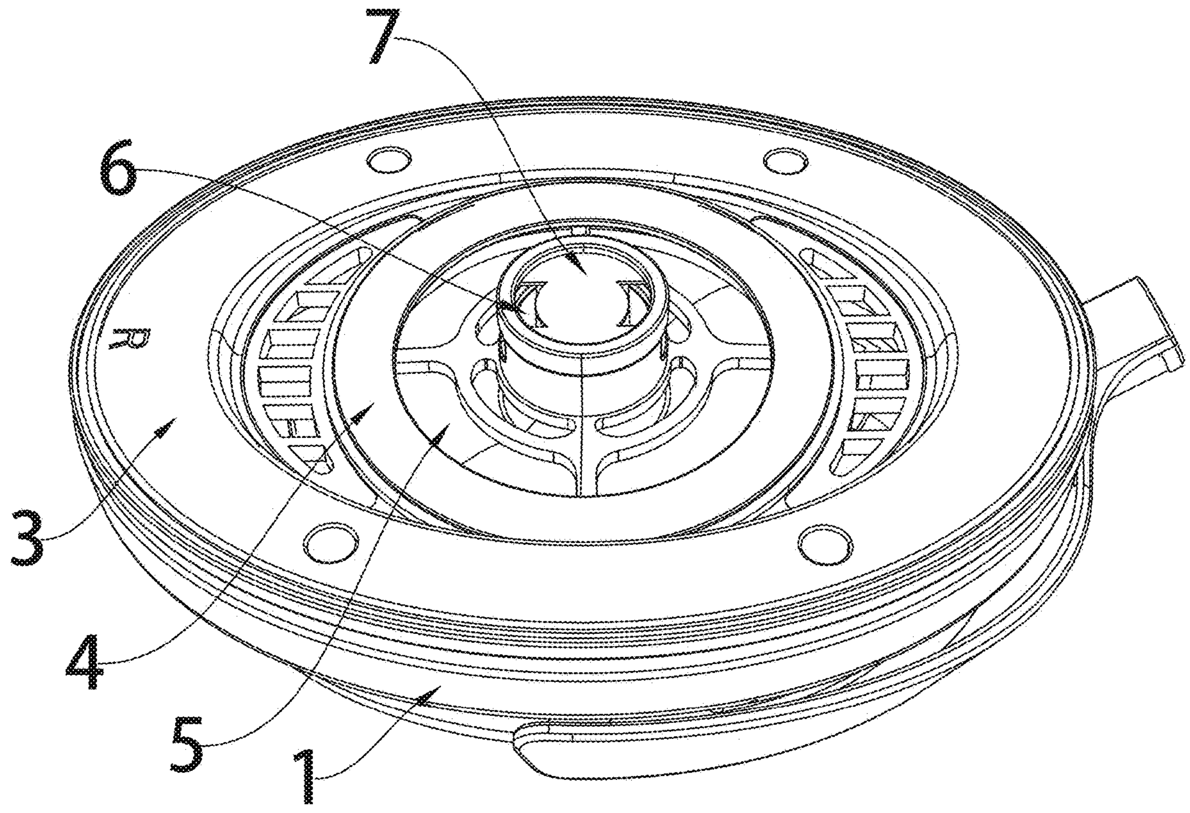
FIG. 3 is a schematic structural diagram of an earphone housing and a hollow mounting bracket of the earphone with coaxial frequency multiplication speaker provided by the present disclosure.

Please refer to FIGS. 1-3, an earphone with coaxial frequency multiplication speaker including an earphone housing 1, a hollow mounting bracket 3 is fixed on an upper of an inner side of the earphone housing 1, a large dynamic coil speaker 5 configured to express middle and low frequencies is provided on an inner side of the earphone housing 1 and a lower of the hollow mounting bracket 3. The large dynamic coil speaker 5 has the characteristics of soft sound, ultra-high power, good bass effect, and wide frequency response. A flat speaker 6 configured to express high frequencies is provided on an inner side of an upper of the hollow mounting bracket 3. The flat speaker 6 has the effects of low distortion, excellent resolution, wide frequency response, and high output power. At the same time, the flat speaker 6 can also be replaced with a high-frequency dynamic coil speaker.

On an inner side of the hollow mounting bracket 3 and an outer side of the flat speaker 6, there is an annular piezoelectric ceramic speaker 4 configured to express medium and high frequencies. An upper of the flat speaker 6 is provided with a circular piezoelectric ceramic speaker 7 configured to express ultra-high frequencies. The annular piezoelectric ceramic speaker 4 and the circular piezoelectric ceramic speaker 7 have a wide frequency response range, clear and natural sound quality, smooth response frequency, and high-quality sound. The annular piezoelectric ceramic speaker 4, the large dynamic coil speaker 5, the flat speaker 6, and the circular piezoelectric ceramic speaker 7 are coaxially arranged to render an overall sound performance of this earphone stronger, better reflect a depth of the sound, and improve a performance of the earphone's full audio.

A diameter of the circular piezoelectric ceramic speaker 7 is smaller than that of the annular piezoelectric ceramic speaker 4, both the annular piezoelectric ceramic speaker 4 and the large dynamic coil speaker 5 are attached to the hollow mounting bracket 3. A head mounted connection bracket is provided on an outer side of the earphone housing 1.

Embodiment 2

Based on Embodiment 1, as shown in FIGS. 1-2, in order to improve a comfort of wearing this earphone, an upper end of the earphone housing 1 is provided with an earmuff 2, which is located at an upper of the hollow mounting bracket 3. The earmuff 2 is made of foam material and is bonded and fixed to the earphone housing 1 through adhesive bonding.

What is claimed is:

1. An earphone with coaxial frequency multiplication speaker, comprising an earphone housing, wherein an upper of an inner side of the earphone housing is provided with a hollow mounting bracket, an inner side of the hollow mounting bracket is provided with an annular piezoelectric ceramic speaker configured to express medium and high frequencies; a large dynamic coil speaker configured to express medium and low frequencies is provided on the inner side of the earphone housing and a lower of the hollow mounting bracket, a flat speaker configured to express high frequencies is provided at an upper of the hollow mounting bracket and an inner side of the annular piezoelectric ceramic speaker, an upper of the flat speaker is provided with a circular piezoelectric ceramic speaker configured to express ultra-high frequencies.

2. The earphone with coaxial frequency multiplication speaker according to claim 1, wherein an upper of the earphone housing is provided with an earmuff, the earmuff is located at the upper of the hollow mounting bracket.

3. The earphone with coaxial frequency multiplication speaker according to claim 1, wherein the annular piezoelectric ceramic speaker, the large dynamic coil speaker, the flat speaker, and the circular piezoelectric ceramic speaker are coaxially arranged.

4. The earphone with coaxial frequency multiplication speaker according to claim 2, wherein the earmuff is made of foam material.

5. The earphone with coaxial frequency multiplication speaker according to claim 1, wherein a diameter of the circular piezoelectric ceramic speaker is smaller than a diameter of the annular piezoelectric ceramic speaker.

6. The earphone with coaxial frequency multiplication speaker according to claim 1, wherein the annular piezoelectric ceramic speaker and the large dynamic coil speaker are both attached to the hollow mounting bracket.

7. The earphone with coaxial frequency multiplication speaker according to claim 1, wherein a head mounted connection bracket is provided on an outer side of the earphone housing.

8. The earphone with coaxial frequency multiplication speaker according to claim 2, wherein the earmuff is fixed to the earphone housing by adhesive bonding.

* * * * *